Sept. 17, 1946.    E. W. M. FAWCETT    2,407,637
PRODUCTION OF BRANCHED CHAIN ALKANES
Filed Oct. 30, 1941
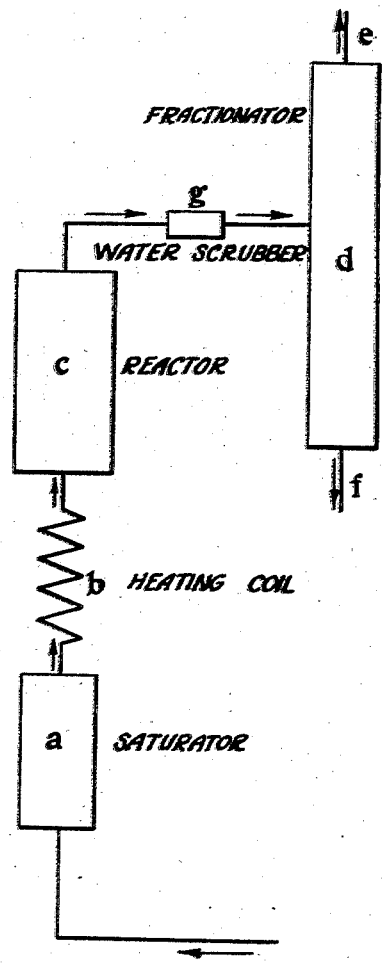
Inventor
E. W. M. Fawcett Patented Sept. 17, 1946

UNITED STATES PATENT OFFICE 2,407,637

PRODUCTION OF BRANCHED CHAIN ALKANES

Eric William Musther Fawcett, Sunbury-on-Thames, England, assignor to Anglo-Iranian Oil Company Limited, London, England, a British joint-stock corporation Application October 30, 1941, Serial No. 417,097
In Great Britain October 2, 1940

6 Claims. (Cl. 260—683.5)

This invention relates to the production of branched chain alkanes from normal alkanes such as isobutane from n-butane or iso-pentane from n-pentane.

It is known that these reactions may be carried out by contacting the normal alkanes or materials containing substantial proportions of normal alkanes with solid aluminium halides particularly aluminium chloride. The process is normally carried out in either liquid or vapour phase at moderately elevated temperatures not exceeding 200° C. by passing a stream of the normal alkane through a reaction vessel packed with solid aluminium chloride or aluminium chloride in admixture with a solid carrier such as carbon.

The applicant has now found that the reaction can be economically and advantageously carried out continuously with a small or minimum proportion of catalyst by passing a stream of the feedstock in the condition of vapor and containing small proportions of aluminium chloride or aluminium bromide vapour through a reaction vessel packed with a solid contact material such as active carbon, silica gel or glass rods, that is porous or sorptive or has a porous or sorptive surface. Since the conversion rate attained is a function of the available surface of the contact material highly porous substances are in general advantageous and in a granular condition or in small pieces. The contact materials themselves have little or no catalytic activity for the isomerisation reaction in the absence of the vapour of an aluminium halide.

The conditions are so determined that the concentration of aluminium halide vapour in the hydrocarbon vapor stream does not exceed a concentration equivalent to the saturation pressure at the reaction temperature, so that thus there is no deposition of solid aluminium chloride in the reaction vessel.

The reaction temperature may be within the limits 0–250° C. but is preferably between 50 and 150° C. The actual temperature to be used must be chosen in relation to the feedstock and the desired product. Thus for the conversion of N-butane to iso-butane reaction temperatures in the range 100–150° C. will most generally be employed. If however the feedstock be normal pentane or a mixture of hydrocarbons containing substantial proportions of n-pentane or a higher normal hydrocarbon and if the process is carried out at a reaction temperature in the range of 100–150° C. the product obtained will consist largely of isobutane and relatively little isopentane etc., on the other hand, if the reaction temperature is maintained below about 75° C., the conversion of n-pentane to isopentane may be achieved. In general, the higher the molecular weight of the normal alkane feedstock, the lower the reaction temperature necessary if the production of hydrocarbons of molecular weight lower than that of the feedstock is to be avoided. It is generally advantageous to operate the process under moderately elevated pressures not exceeding 50 atmospheres and usually of about 10 atmospheres since the variation of conversion rate with operating pressure is such that the amount of branched chain alkane product obtained from a given reaction volume increases progressively with increasing pressure until the liquefaction point of the hydrocarbons is approached. In general therefore it is most advantageous to operate at the highest possible pressure, provided that the liquid phase is always absent at the reaction temperature; the maximum pressure that can be used will of course be controlled by the reaction temperature and the nature of the feedstock.

The catalyst concentration required is in general very small and does not exceed 20% by weight of the hydrocarbon stream and is preferably much less than 10% by weight, thus very favourable results have been attained by operating with catalyst concentrations as low as .005% by weight in a normal butane stream.

In view of the great catalyst activity attained under the conditions described a conversion rate is possible of at least 300 times the rate attainable with an equal volume of pure aluminium chloride under otherwise similar conditions. It is possible to operate at relatively low temperatures in the range 50–100° C. with reasonable product outputs, which is advantageous since side reactions are eliminated and great economy in the use of aluminium chloride is attained.

The invention is hereinafter described with reference to the accompanying diagrammatic drawing.

The vapourised alkane enters the lower end of an aluminium chloride saturator $a$ which is packed with pieces of aluminium chloride and maintained at a determined temperature to introduce the desired proportion of aluminium chloride vapour into the vapourised hydrocarbon. The temperature may be determined from the vapour pressure-temperature curve for aluminium chloride prepared from the data available in the International Critical Tables, vol. 3, pp. 207 and 208. The hydrocarbon-aluminium chloride vapour mixture may then be preheated to the reaction temperature in the heating coil $b$ and enter the reaction vessel $c$ which is loosely packed with a solid material such as active carbon which may be in a granulated condition or in small pieces. After leaving the reactor the hydrocarbon-aluminium chloride vapour may be freed from aluminium chloride in a water scrubber $g$, and the hydrocarbons submitted to fractionation in the column $d$, yielding in general the branched chain product at $e$, and the unreacted normal alkanes at $f$, the latter being re-circulated to the saturator a, advantageously with the fresh feedstock.

Alternatively, the aluminium chloride remaining in the hydrocarbon vapour leaving the reactor c instead of being washed out in the water scrubber may be recovered for further use by taking off the normal alkanes and aluminium chloride at the outlet f. This mixture may be re-vapourised and mixed with a quantity of fresh normal alkanes equivalent to the branched chain alkanes removed at e, and re-circulated to the reactor c.

In general it is necessary to pass a portion of the circulating gas through the saturator a to make up the small unavoidable loss of aluminium chloride.

It is known that the activity of the aluminium halide is increased in the presence of a hydrogen halide, and accordingly a small proportion of hydrogen halide may be introduced with the stream of n-butane, n-pentane or other alkane, hydrogen chloride being advantageously used. The amount added should not in general exceed 10% by weight of the alkane and will normally lie within the range .1 to 1% by weight of the alkane.

Thus according to the process of the invention a continuous stream of catalyst in the form of vapour passes through the reaction vessel c at a flow rate depending on the temperature at which the catalyst saturator is maintained. The amount of catalyst used is thus controlled by that temperature, and having regard to the great activity of the catalysts at moderate temperatures the process may be carried out at temperatures below 100° C. and the proportion of catalyst used is very small. For example about 1000-2000 lbs. of isobutane may be produced per pound of aluminium chloride used.

The temperature maintained in the aluminium chloride saturator and the reaction vessel need not be identical. Thus, it will be clear that the rate of flow of the catalyst (i. e. the catalyst usage) is controlled by the temperature of the saturation vessel while the conversion rate of normal branched chain alkanes is mainly controlled by the temperature of the reaction vessel. Since the conversion rate increases with increasing reaction temperature, it is frequently advantageous to operate with the saturation vessel in the range 80–100° C., and the reaction vessel in the range 130–150° C. or even higher for by this means the desirable effects of low catalyst usage and high conversion rate are both achieved.

It will be understood that the catalyst vapour leaving the reaction vessel c may be removed from the product stream in any convenient manner and recovered for re-use.

In the saturator some degree or reaction will occur depending on the temperature and time of contact of the gas stream with solid aluminium halide, but this will be small in relation to the extent of the reaction within the reaction vessel proper, in view of the low order of activity of solid aluminium chloride and in general the relatively short contact time in the saturation vessel.

In commencing operation with a fresh batch of catalyst, it is in general desirable, particularly when the reaction temperature is relatively low, to operate the saturation vessel for a short period at relatively high temperature and then to reduce the temperature to the desired value, since in this way the greater or maximum activity of the catalyst is more rapidly developed.

The following are examples of process conditions and yields of isoalkanes:

Example 1.—A stream of normal butane (180 ccs./minute) and hydrogen chloride (6 ccs./minute) at atmospheric pressure was passed through a saturator (volume 50 ccs.) containing aluminum chloride in the form of coarse powder and maintained at 120° C. The gas stream leaving the saturator contained 2.8% isobutane and 0.058 grams aluminum chloride per gram of butane, and was passed to a reaction vessel, of 110 ccs. capacity packed with refractory glass rods (5 mms. diameter and 12 mms. long), maintained at a temperature of 123° C. The product stream leaving the reactor contained 14% of isobutane. The catalyst concentration in the reaction vessel was 2.15% by volume.

Example 2.—A stream of normal butane (25 volumes per minute) and hydrogen chloride (.77 volumes per minute) was passed through an aluminium chloride saturator maintained at 110° C. The gas stream leaving the saturator, containing a negligible proportion (less than 1%) of isobutane, and about .005% of aluminium chloride vapour by volume or 0.022 grams aluminum chloride per gram of butane, was passed through the reaction vessel containing granular active carbon at 110° C. at a rate equivalent to 30 gas volumes per volume of carbon per hour. The product stream from the reaction vessel was found to contain 51% of isobutane.

Example 3.—In an experiment similar to that of Example 1, but with the saturator and reactor at 85° C., the flow rates being 25 volumes per minute of normal butane (30 volumes of gas per volume of catalyst per hour) and 1.32 volumes per minute of hydrogen chloride and the concentration of the catalyst being 0.00176 gram per gram of butane, the product stream contained 32% of isobutane.

Example 4.—Under conditions similar to that of Example 2, but at a temperature of 132° C. maintained both in the saturator and in the reactor and using alumina pellets in place of active carbon in the reaction vessel, 12.5 volumes of gaseous butane per minute and 1.39 volumes of hydrogen chloride were contacted with the catalyst. The catalyst concentration in the stream entering the reaction vessel was approximately 0.161 gram of aluminum chloride per gram of butane. The final product contained 38.0% of isobutane.

Example 5.—A stream of n-butane at atmospheric pressure was passed through an aluminum chloride saturation vessel maintained at 100° C. and then passed through a reaction vessel containing active carbon at 132° C. at a rate equivalent to 30 volumes of gaseous butane/volume of carbon/hour. The reaction product contained 32% of isobutane. In a similar experiment with the reaction vessel at 154° C. the product contained 42% isobutane. The concentration of aluminum chloride present in the hydrocarbon stream entering the reaction vessel was approximately 0.0084 gram per gram of butane.

The following examples illustrate the operation carried out at superatmospheric pressure:

Example 6.—The reaction vessel was packed with granular active carbon, and the reactor and saturator maintained at 110° C. A butane stream under a pressure of 8 atmospheres and containing .15% by volume of hydrogen chloride was passed through the saturator and reactor in succession. The flow rate was equivalent to 2.7 volumes of liquid butane per volume of catalyst per hour, and the product was found to contain 40.0% of isobutane. The concentration of aluminum chloride present in the hydrocarbon stream entering the reaction vessel was approximately 0.0028 gram per gram of butane.

*Example 7.*—In this example the saturator was maintained at 123° C. and the reactor at 132° C. The latter was packed with pelleted alumina. The conditions were otherwise the same as in Example 6. A gas stream of butane (12.5 volumes per minute) and hydrogen chloride (.67 volume per minute) was passed and the gas product contained 22.0% of isobutane. The concentration of aluminum chloride present in the hydrocarbon stream entering the reaction vessel was approximately 0.0091 gram per gram of butane.

The apparatus in which the process is carried out may be provided of units constructed and equipped in known manner for carrying out the process under the conditions hereinbefore described, and the saturator and the reaction vessel may be constructed in known manner to permit of their being re-charged respectively with fresh catalyst and porous or sorptive substances or substances having porous or sorptive surfaces. This may conveniently be done in the use of removable containers adapted for example for upward withdrawal from the reaction vessel or the saturator, the containers being for example cylindrical in form and adapted for the upward passage through the material in the containers of the normal alkane vapour and the normal alkane carrying the catalyst in the condition of vapour heated to the reaction temperature respectively; or the respective containers may be provided of annular, or inverted cup-shape, whereby the vapour or vapours may pass into a central admission chamber whence to flow transversely through the perforated walls of the container and through the material in the containers to a surrounding annular space within the casing through which the vapours or reaction mixture may pass to the respective outlet; and the outlets respectively on the saturator and the reaction vessel may advantageously be disposed laterally at or near the upper end and the preheating coil out of line with the saturator and reaction vessel. The fractionating column may be of conventional construction equipped in a determined position for the admission of the reaction mixture or the reaction mixture from which the catalyst has been removed, and at the upper end with an outlet for the branched chain alkane product and at the lower end with an outlet for the unreacted normal alkanes.

Where only a small proportion of the aluminum halide catalyst is required under the conditions of process of the invention, only a part of the vapourised stream of normal alkane may be passed through the saturator, while another or the main part of the stream of normal alkane may be passed directly to the heating coil together with the vapours from the saturator.

I claim:

1. A continuous process for the production in the vapour phase of branched chain alkanes from a normal alkane feedstock by isomerization at a moderate reaction temperature and at a pressure in the range of atmospheric pressure to 50 atmospheres, consisting in contacting a stream of said normal alkane feedstock in the condition of vapour and at a selected vapourising temperature not substantially exceeding 132° C. with a solid unsupported aluminium halide to effect a continuous evolution and transfer of aluminium halide vapour from said solid unsupported aluminium halide to said stream, maintaining a flow rate of said stream at said selected vapourising temperature at which the concentration in said stream of aluminium halide transferred as vapour thereto does not exceed a concentration equivalent to the saturation pressure of said aluminium halide at said moderate isomerisation reaction temperature, contacting said stream with its content of aluminium halide vapour at said moderate isomerisation reaction temperature below 200° C., and in the presence of a small proportion of a hydrogen halide promoter, with a solid porous adsorbent contact material essentially free of aluminum halide in condensed form, and recovering the branched chain alkane product.

2. A process as specified in claim 1, in which the temperature at which the normal alkane feedstock is contacted with the aluminium halide for the entrainment of a small proportion of the aluminium halide, is in the range 80–100° C., and the temperature at which the normal alkane feedstock and its content of aluminium halide vapour is contacted in the presence of a small proportion of a hydrogen halide promoter with a porous adsorptive material, is in the range 130–150° C.

3. A process as specified in claim 1, in which the proportion of the aluminium halide catalyst is less than 10% by weight of the normal alkane content of the feedstock.

4. A process as specified in claim 1, in which the rate of flow of the entrained catalyst and normal alkane feedstock vapours is determined and controlled by the temperature at which the normal alkane feedstock is contacted with the aluminium halide, and the rate of conversion by the isomerisation reaction temperature.

5. A process as specified in claim 1, in which the reaction mixture on leaving the reactor passes through a water scrubber for the removal therefrom of the aluminium halide content, before the branched chain alkane product is recovered.

6. A continuous process for the production in the vapour phase of branched and more highly branched alkanes from normal and less highly branched alkanes by isomerisation at a moderate reaction temperature and at a pressure in the range of atmospheric pressure to 50 atmospheres, comprising the steps of continuously flowing an alkane-containing stream in the condition of vapour through a saturating zone and over a solid unsupported aluminium halide catalyst contained therein, maintaining said zone at a selected catalyst vapourising temperature to effect a continuous evolution and transfer of catalyst vapours from said solid unsupported aluminium halide catalyst to said stream; maintaining a flow rate of said stream at said selected vapourising temperature at which the concentration in said stream of said catalyst transferred as vapour thereto does not exceed a concentration equivalent to the saturation pressure of said catalyst at said moderate isomeration reaction temperature; passing the stream at said moderate isomerisation reaction temperature below 200° C. with its content of catalyst vapour, together with a small proportion of hydrogen halide promotor, through a reaction zone containing a bed of solid highly porous adsorptive contact material essentially free of catalyst in a condensed form; and, recovering the branched chain alkane product from the effluent of said reaction zone.

ERIC WILLIAM MUSTHER FAWCETT.